(12) United States Patent
Sakurai et al.

(10) Patent No.: US 10,819,026 B2
(45) Date of Patent: Oct. 27, 2020

(54) COVER MEMBER HAVING CURVED SURFACES, AND RADAR APPARATUS INCORPORATING THE COVER MEMBER

(71) Applicant: DENSO CORPORATION, Kariya, Aichi-pref. (JP)

(72) Inventors: Kazumasa Sakurai, Nishio (JP); Yuji Sugimoto, Nishio (JP); Kazushi Kawaguchi, Nishio (JP); Asahi Kondo, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 551 days.

(21) Appl. No.: 15/539,078

(22) PCT Filed: Dec. 24, 2015

(86) PCT No.: PCT/JP2015/085936
§ 371 (c)(1),
(2) Date: Jun. 22, 2017

(87) PCT Pub. No.: WO2016/104561
PCT Pub. Date: Jun. 30, 2016

(65) Prior Publication Data
US 2017/0352950 A1    Dec. 7, 2017

(30) Foreign Application Priority Data

Dec. 25, 2014  (JP) ................... 2014-262894

(51) Int. Cl.
*H01Q 1/42*     (2006.01)
*G01S 7/02*     (2006.01)
(Continued)

(52) U.S. Cl.
CPC .............. *H01Q 1/42* (2013.01); *G01S 7/02* (2013.01); *G01S 7/03* (2013.01); *G01S 13/42* (2013.01);
(Continued)

(58) Field of Classification Search
CPC .......................... G01S 13/931; H01Q 1/42
See application file for complete search history.

(56) References Cited

U.S. PATENT DOCUMENTS 5,689,276 A * 11/1997 Uematsu .............. H01Q 1/3275
                                                343/713
5,926,127 A *  7/1999 Schmidt .................. G01S 7/032
                                                342/175
(Continued)

FOREIGN PATENT DOCUMENTS

JP    H03-10407      1/1991
JP    2005-337759 A  12/2005
(Continued)

*Primary Examiner* — Peter M Bythrow
(74) *Attorney, Agent, or Firm* — Maschoff Brennan

(57) ABSTRACT

A radar apparatus is provided with transmitting means, receiving means, target detection means, azimuth detection means and a cover member. The cover member has a first face and a second face. The first face and second face are not parallel to one another. At least one of the first face and second face is a curved surface which is curved along azimuth detection directions of the azimuth detection means, such as to provide a large phase difference between incoming waves that are received by a plurality of antenna elements and are from within a range of large angular values in the azimuth detection directions of the azimuth detection means.

8 Claims, 5 Drawing Sheets

(51) Int. Cl.
- *G01S 7/03* (2006.01)
- *H01Q 1/32* (2006.01)
- *G01S 13/931* (2020.01)
- *G01S 13/42* (2006.01)

(52) U.S. Cl.
CPC ......... *G01S 13/931* (2013.01); *H01Q 1/3233* (2013.01); *G01S 2007/027* (2013.01)

(56) References Cited

U.S. PATENT DOCUMENTS

| | | | | |
|---|---|---|---|---|
| 5,955,752 A * | 9/1999 | Fukaya | ................... | G01S 7/032 257/275 |
| 6,496,138 B1 * | 12/2002 | Honma | ................ | G01S 13/931 342/27 |
| 7,075,496 B2 | 7/2006 | Hidai | ...................... | H01Q 1/42 343/753 |
| 7,132,976 B2 * | 11/2006 | Shinoda | ................ | G01S 7/2925 342/70 |
| 8,149,157 B2 * | 4/2012 | Takeuchi | ................... | G01S 7/03 342/70 |
| 8,184,064 B2 * | 5/2012 | Sanford | ................... | H01Q 1/42 343/872 |
| 8,633,865 B2 * | 1/2014 | Miyagawa | ............... | H01Q 1/42 343/705 |
| 8,765,230 B1 * | 7/2014 | Waldrop, III | ............ | H01Q 1/42 427/402 |
| 2003/0052829 A1 * | 3/2003 | Desargant | ................ | H01Q 1/28 343/705 |
| 2003/0169199 A1 * | 9/2003 | Kondo | .................... | G01S 7/032 342/175 |
| 2006/0158369 A1 * | 7/2006 | Shinoda | ................ | G01S 7/2925 342/70 |
| 2008/0062038 A1 * | 3/2008 | Ouchi | .................... | G01S 7/032 342/175 |
| 2009/0140912 A1 * | 6/2009 | Kato | ......................... | G01S 7/35 342/70 |
| 2010/0039346 A1 * | 2/2010 | Peter | ....................... | H01Q 1/40 343/872 |
| 2011/0248902 A1 * | 10/2011 | Miyagawa | ............... | H01Q 1/42 343/872 |
| 2012/0249358 A1 * | 10/2012 | Stratis | ..................... | G01S 7/024 342/62 |
| 2015/0349414 A1 * | 12/2015 | Tagi | ......................... | G01S 7/03 343/872 |

FOREIGN PATENT DOCUMENTS

| | | |
|---|---|---|
| JP | 2006-145399 | 6/2006 |
| JP | 2008-058130 A | 3/2008 |

* cited by examiner

COVER MEMBER HAVING CURVED SURFACES, AND RADAR APPARATUS INCORPORATING THE COVER MEMBER

CROSS-REFERENCE TO RELATED APPLICATION

This application is based on and claims the benefit of priority from earlier Japanese Patent Application No. 2014-262894 filed Dec. 25, 2014, the description of which is incorporated herein by reference.

BACKGROUND OF THE INVENTION

Technical Field

The present disclosure relates to a radar apparatus, and to a cover member used in the radar apparatus.

Background Art

In the prior art, for example as disclosed in Japan Patent Publication No. 2008-58130, a radar apparatus is disclosed which detects probe waves reflected from targets, based on the results of transmitting the probe waves from a transmitting antenna and receiving incoming waves by a receiving antenna having a plurality of antenna elements. With such a type of radar apparatus, the azimuth direction of a target is detected based on phase differences between the incoming waves received by respective antenna elements of the receiving antenna.

PRIOR ART LITERATURE

Patent Literature

[Patent Document 1] Japan Patent Publication No. 2008-58130

Generally, the greater the angle of inclination of incoming waves with respect to the antenna frontal direction, within the wide range of angles of the incoming waves, the smaller become the phase difference between the waves at the antenna elements. For that reason the problem usually arises, with direction detection in a wide angular range, that the azimuth direction detection accuracy becomes low in the case of incoming waves which arrive from azimuth directions that are within a range of large angular values.

SUMMARY

The present disclosure has been envisaged in view of this problem.

One aspect of the present disclosure relates to a radar apparatus (1, 3) having transmitting means (12), receiving means (14), target detection means (18), azimuth detection means (18), and a cover member (20, 50).

The transmitting means transmits probe waves. The receiving means has a plurality of antenna elements (15) and receives incoming waves at each of the antenna elements. The target detection means detects targets that are sources of the incoming waves, based on the results of transmitting the probe waves by the transmitting means and receiving the incoming waves by the receiving means. The azimuth detection means detects azimuth directions in which respective targets detected by the target detection means are present, based on phase differences between the incoming waves received by the plurality of antenna elements.

The cover member is disposed opposite the receiving means such so as to cover at least the receiving means.

The cover member has a first face (26, 56) that is opposite the receiving means and through which incoming waves pass, and a second face (28, 58) opposite the first face, through which incoming waves pass.

In the cover member, the first face and the second face are not parallel to one another. Furthermore at least one of the first and second faces is formed with a curved surface that is curved along azimuth detection directions of the azimuth detection means.

With such a radar apparatus, incoming waves which are reflected waves that have been transmitted from the transmitting means and reflected by a target, are refracted at the second face and the first face of the cover member. These refractions are such that the greater the angle at which incoming waves arrive, within a range of large angular values, the greater becomes the phase difference between the incoming waves received by the plurality of antenna elements. That is to say, with the radar apparatus of the present disclosure, a corrected condition is established whereby the phase difference between incoming waves received by the plurality of antenna elements becomes large.

As a result, with the radar apparatus of the present disclosure, improved accuracy of direction detection can be achieved over a wide angular range.

One aspect of the present disclosure is a cover member used by a radar apparatus.

The signs shown in parentheses in the "Claims" and in the "Solution to Problem" indicate a relationship to means specified in embodiments that are described hereinafter as modes, and do not limit the technical scope of the disclosure.

DETAILED DESCRIPTION OF PREFERRED EMBODIMENTS

Figure 1:
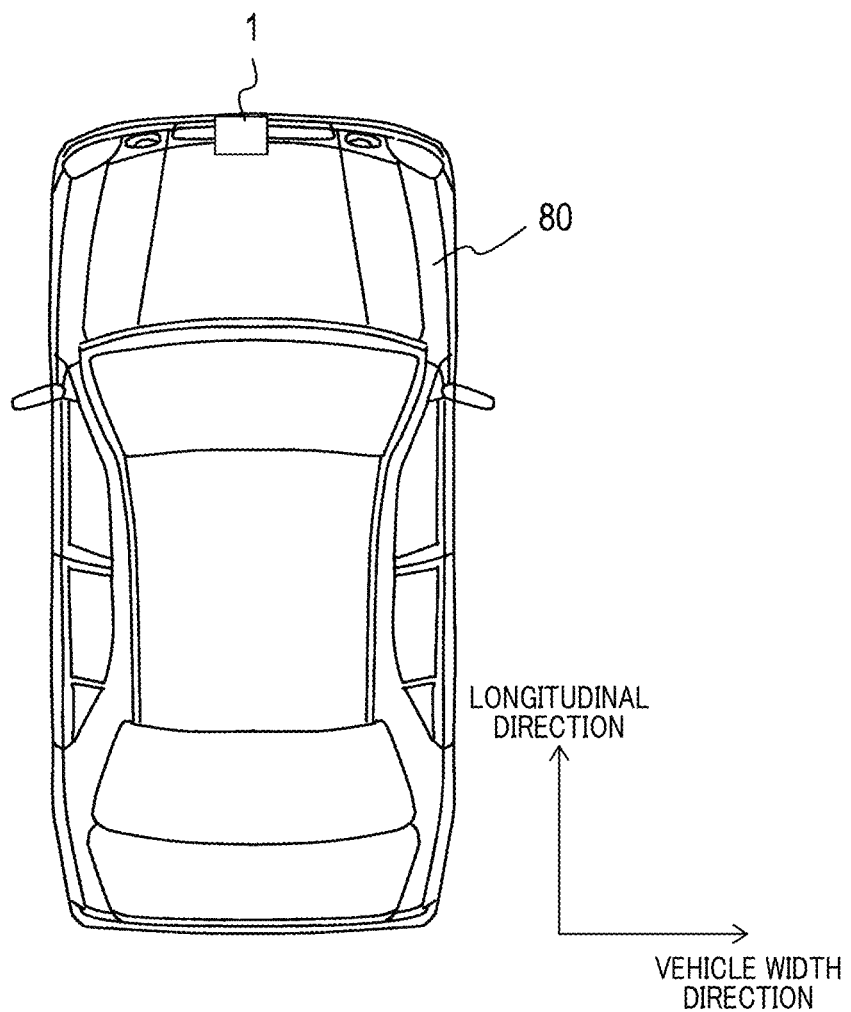
FIG. 1 is an explanatory diagram showing the installation location of a radar apparatus according to embodiments of the present disclosure.

Embodiments of the disclosure are described in the following to referring to the drawings.

First Embodiment (Radar Apparatus)

As shown in FIG. 1, a radar apparatus 1 is installed in a forward part (for example, a front grille) of a 4-wheel vehicle 80.

The radar apparatus 1 transmits probe waves (radar waves) which are electromagnetic waves in the millimeter-wave band, and receives incoming waves which are reflected waves of the probe waves. Respective targets that have reflected the probe waves are detected based on the reception result.

The term "target" as used herein refers to a source of the incoming waves, including objects which are on the road and buildings which are around the road. Such objects can include, for example, cars, roadside objects, traffic lights, pedestrians, etc.

The radar apparatus 1 includes a transmitting section 10, a transmitting antenna section 12, a receiving antenna section 14, a receiving section 16, a signal processing section 18, and a cover member 20.

The transmitting section 10 generates probe waves in accordance with signals from the signal processing section 18. The probe waves generated by the transmitting section 10 may be pulsed waves or a continuous wave. A continuous wave may be frequency modulated. In the case of applying frequency modulation, the modulation may be executed such that, along the time-axis, there are rising segments in which the frequency gradually increases and falling segments in which the frequency gradually decreases. That is, the radar apparatus 1 may be configured as pulse radar, CW (continuous wave) radar, FMCW (frequency modulated continuous wave) radar, or some other form of radar.

The transmitting antenna section 12 radiates the probe waves generated by the transmitting section 10. The transmitting antenna section 12 in this embodiment may be composed of a single antenna element or a plurality of antenna elements.

The receiving antenna section 14 has a plurality of antenna elements 15-1 to 15-N, and receives incoming waves at each antenna element 15. The "incoming waves" referred to here include probe waves radiated from the transmitting antenna section 12 and reflected by targets. It is to be noted that the receiving antenna section 14 in this embodiment is situated above the transmitting antenna section 12 with respect to the vehicle height direction (i.e., the vertical direction) of the four-wheel vehicle 80.

The receiving section 16 executes preprocessing of the incoming waves received by the receiving antenna section 14, as required for detecting targets. The preprocessing here includes sampling incoming waves, removing noise from incoming waves, and so on.

The signal processing section 18 includes at least one known type of microcomputer. The signal processing section 18 detects a target by using a known type of processing, based on incoming waves that have been subjected to preprocessing in the receiving section 16 and on the probe waves generated by the transmitting section 10, while also calculating at least the distance to the target. The signal processing section 18 executes direction detection process for detecting azimuth directions in which respective targets that are sources of the incoming waves are present, based on phase differences between the incoming waves received by the antenna elements 15. The meaning of "azimuth direction" of a target as used herein includes the angle between a position where a target is present and the front direction of the antenna elements 15.

With this embodiment, the method of direction detection may be for example beam forming, or MUSIC (Multiple Signal Classification), etc.

When the radar apparatus 1 is configured as a FMCW radar, the signal processing section 18 may be at least one calculation processing apparatus (for example a DSP: Digital Signal Processor) which executes FFT (Fast Fourier Transform) processing, etc., on the data from the receiving section 16.

<Cover Member>

Figure 2:
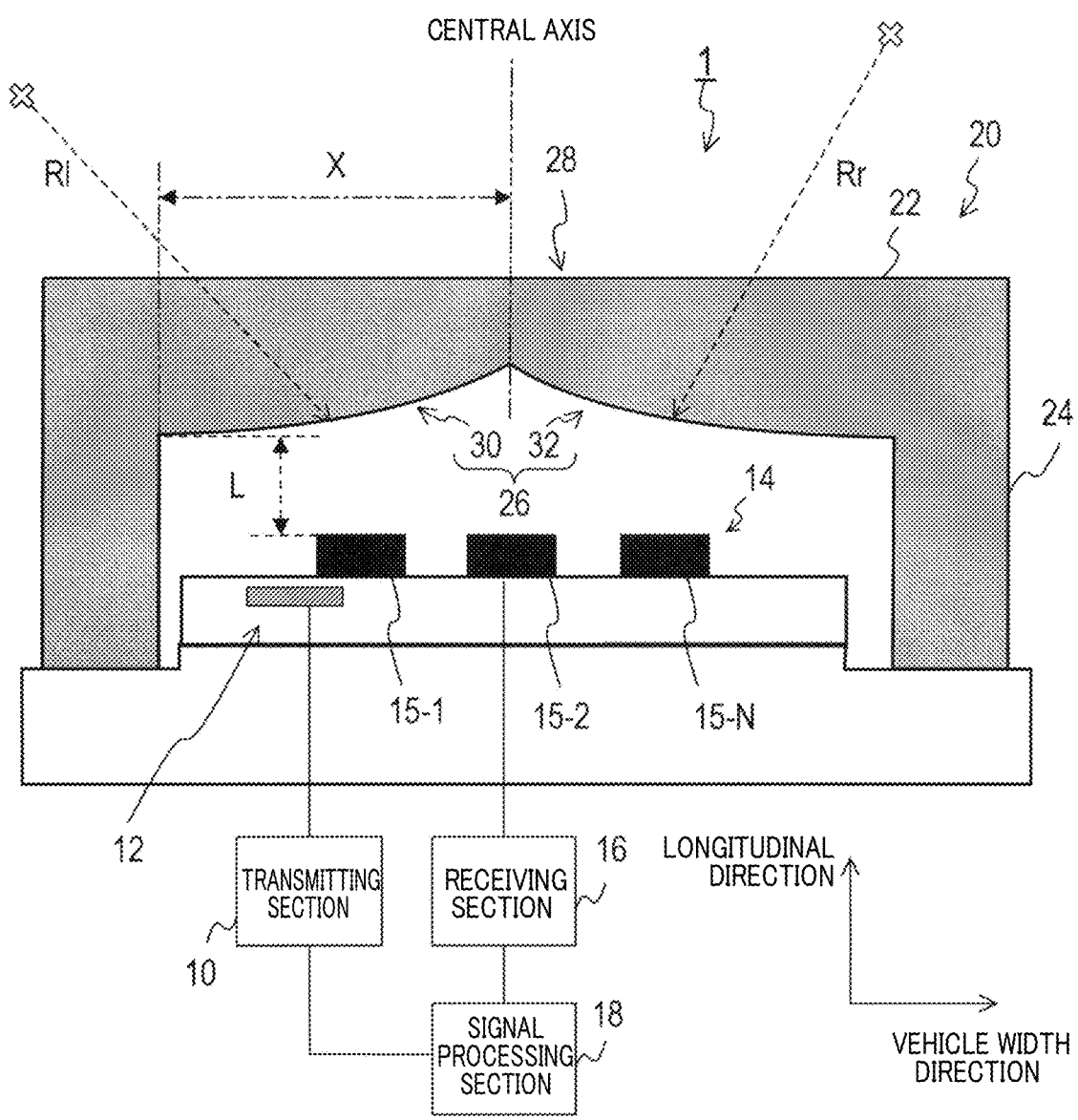
FIG. 2 is an explanatory diagram showing the general configuration of a first embodiment of a radar apparatus.

As shown in FIG. 2, the cover member 20 is a member that is commonly known as a radome, which covers the transmitting antenna section 12 and the receiving antenna section 14. The cover member 20 is made of a material that is permeable to electromagnetic waves (that is, the probe waves) in the millimeter-wave band, and is disposed facing the transmitting antenna section 12 and the receiving antenna section 14. The cover member 20 is shown in FIG. 2 in cross-section, in a view taken along the vehicle width direction (that is, the horizontal direction) and the longitudinal direction of the four-wheel vehicle 80.

The cover member 20 includes a cover center section 22 formed with a plate shape and wall sections 24 extending upright in a common direction from the peripheral edge of the cover center section 22.

The cover center section 22 is formed with a first face 26 and a second face 28. The first face 26 is disposed opposite the receiving antenna section 14.

The second face 28 is disposed opposite the first face 26 and is a face on which incoming waves are incident. The second face 28 of this embodiment is formed with a flat surface, that is parallel to the horizontal and vertical directions.

The first face 26 is not parallel to the second face 28, and is formed of a first opposing face 30 and a second opposing face 32. The first opposing face 30 and the second opposing face 32 constitute a continuous surface and are formed symmetrically with respect to the center of the azimuth detection directions (i.e., center of the vehicle width direction) as a central axis.

The first face 26 is formed as a curved surface, and the thickness from the second face 28 to the first face 26 along a longitudinal direction (i.e., direction in which incoming waves pass) increases in accordance with distance from the axis. Specifically, each of the first opposing face 30 and the second opposing face 32 is formed in a shape (curved surface) that is curved with a specified radius of curvature R1, Rr. The circle centers corresponding to the radiuses of curvature are located on further side at which targets are present than side of the first face 26 with respect to the longitudinal direction. That is, each of the first opposing face 30 and the second opposing face 32 is formed with a curved surface that is convex toward the antenna elements 15.

Furthermore the respective radiuses of curvature R1, Rr of the first opposing face 30 and the second opposing face 32 are specified such that, the greater the angle at which incoming waves arrive with respect to the frontal direction of the antenna elements 15, within a large-angle range, the greater becomes the phase difference between the incoming waves received by the plurality of antenna elements 15.

Figure 3:
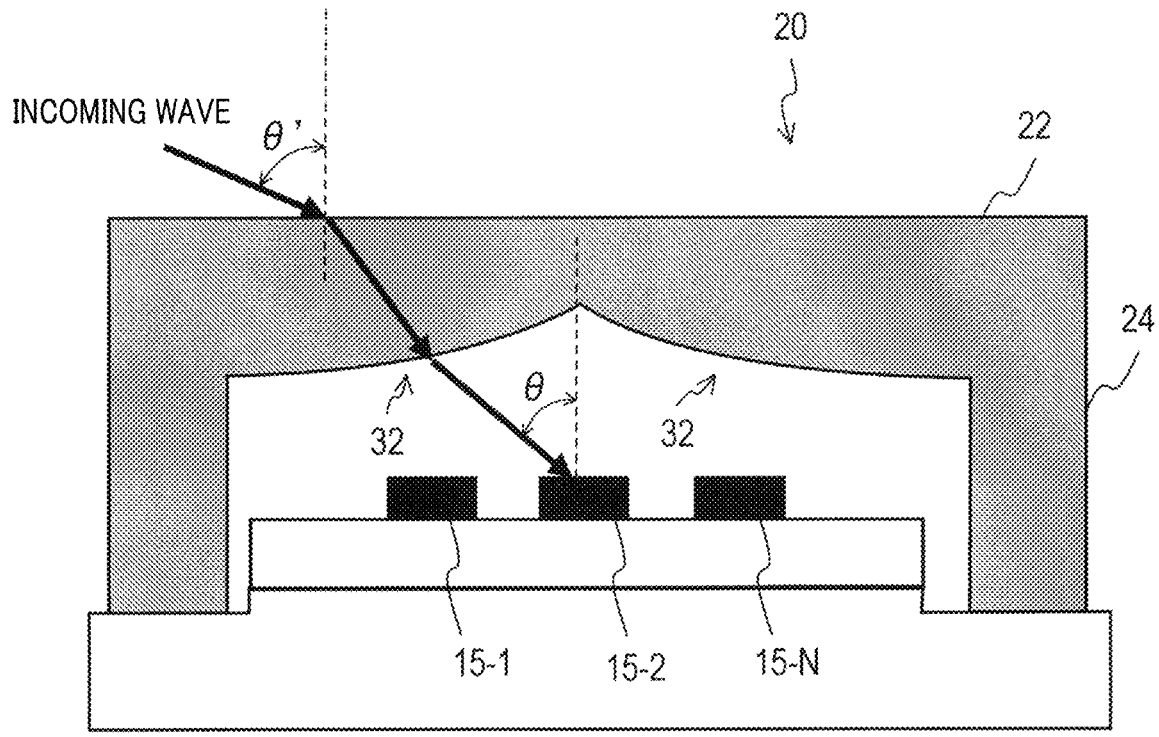
FIG. 3 is a diagram for describing the effects of a cover member in the first embodiment.

Specifically, based on the following equations (1)~(7), as shown in FIG. 3, the radii of curvature R1, Rr are set such that the angle of inclination θ at which an incoming wave reaches the antenna elements 15 is smaller than the angle of inclination θ' at which the incoming wave reaches the second face of the cover member 20.

[Math. 1]

$$a = X - L \times \tan\theta \quad (1)$$

$$\theta_s = \tan\theta^{-1}\frac{a}{\sqrt{r^2-a^2}} \quad (2)$$

$$\theta_i = |\theta_s - \theta| \quad (3)$$

$$\theta_t = \sin^{-1}\frac{\sin\theta_i}{\sqrt{\varepsilon}} \quad (4)$$

When $\theta \le \theta s$ (5)
$$\theta_{t2} = \theta_s - \theta_t$$

When $\theta > \theta s$ (6)
$$\theta_{t2} = \theta_s + \theta_t$$

$$\theta' = \sin^{-1}(\sqrt{\varepsilon}\sin\theta_{t2}) \quad (7)$$

Here, the symbol X denotes the length from the inner wall of the wall section 24 of the cover member 20 to the central axis, and the symbol L denotes the length from the surface of the antenna elements 15 to the inner surface of the cover member 20. The symbol c denotes the dielectric constant of the cover member 20.

In this embodiment, the first face 26 and the second face 28 of the cover member 20 are formed such that that cross-sections along the vehicle height direction of the four-wheel vehicle 80 are uniform.

Action and Advantageous Effects of First Embodiment

As shown in FIG. 3, incoming waves from a target which are incident on the cover member 20 are refracted at the second face 28. The incoming waves that have been refracted at the second face 28 are refracted when passing through the first face 26, and are then received by the antenna elements 15.

The first opposing face 30 and the second opposing face 32 of this embodiment are formed with curved faces having specified radii of curvatures R, Rr, such as to be convex towards the antenna elements 15. The radii of curvatures R, Rr are specified such that the angle of incidence θ at which an incoming wave reaches the antenna elements 15 is smaller than the angle of incidence θ' at which the incoming wave reaches the second face 28 of the cover member 20.

Hence with the radar apparatus 1, it becomes possible to increase the phase difference, at the antenna elements 15, between those incoming waves which have been transmitted from the transmitting antenna section 12 and reflected by a target and arrive at angles that are within a range of large angular values.

As a result, with the radar apparatus 1, improved accuracy of direction detection can be achieved for azimuth directions that are within a range of large angular values.

Figure 4:
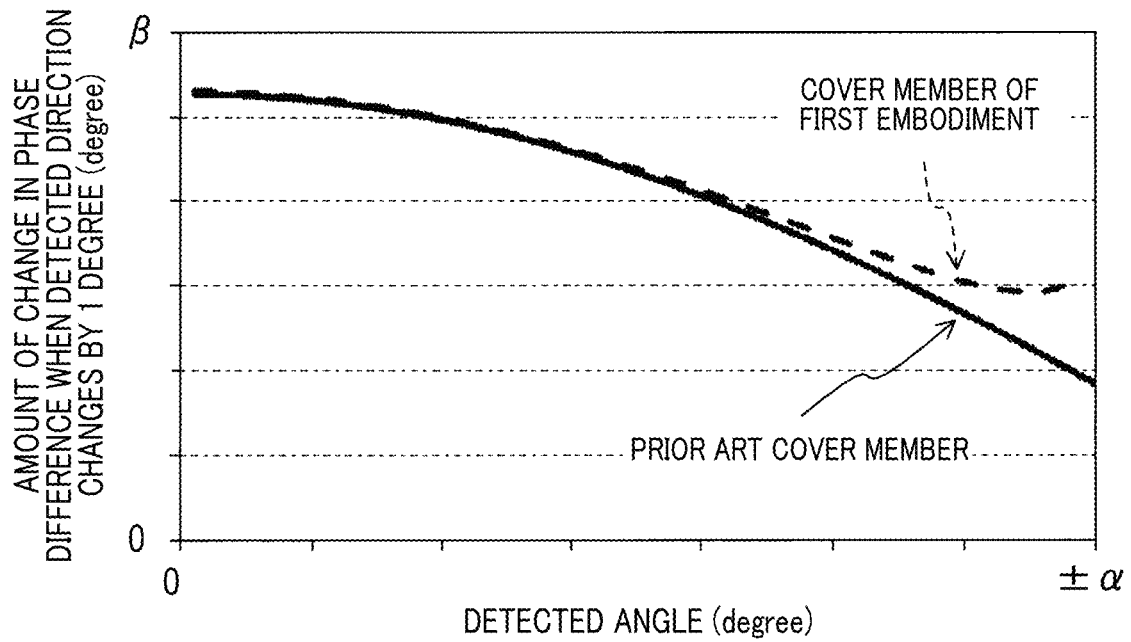
FIG. 4 is a graph showing the effects of the cover member in the first embodiment.

In addition, the inventors of the present disclosure have conducted simulations using the cover member 20 described for the first embodiment. The simulation results are shown in FIG. 4. FIG. 4 is a graph showing the amount of change in phase difference for a change in detected azimuth direction of one degree, in the direction detection angular range. As shown in FIG. 4, it was confirmed that when the cover member 20 is used, the phase difference in the antenna elements 15 becomes large for incoming waves from azimuth directions that are within a range of large angular values, by comparison with a conventional cover member.

From this it is apparent that, by using the cover member 20, it becomes possible to achieve improved accuracy of detecting azimuth directions by the radar apparatus 1, within a wide angular range.

Modified Forms of the First Embodiment

Although the present disclosure has been described above for an embodiment, the disclosure is not limited to the above embodiment and can be implemented in various modes without departing from the spirit of the invention.

Figure 5:
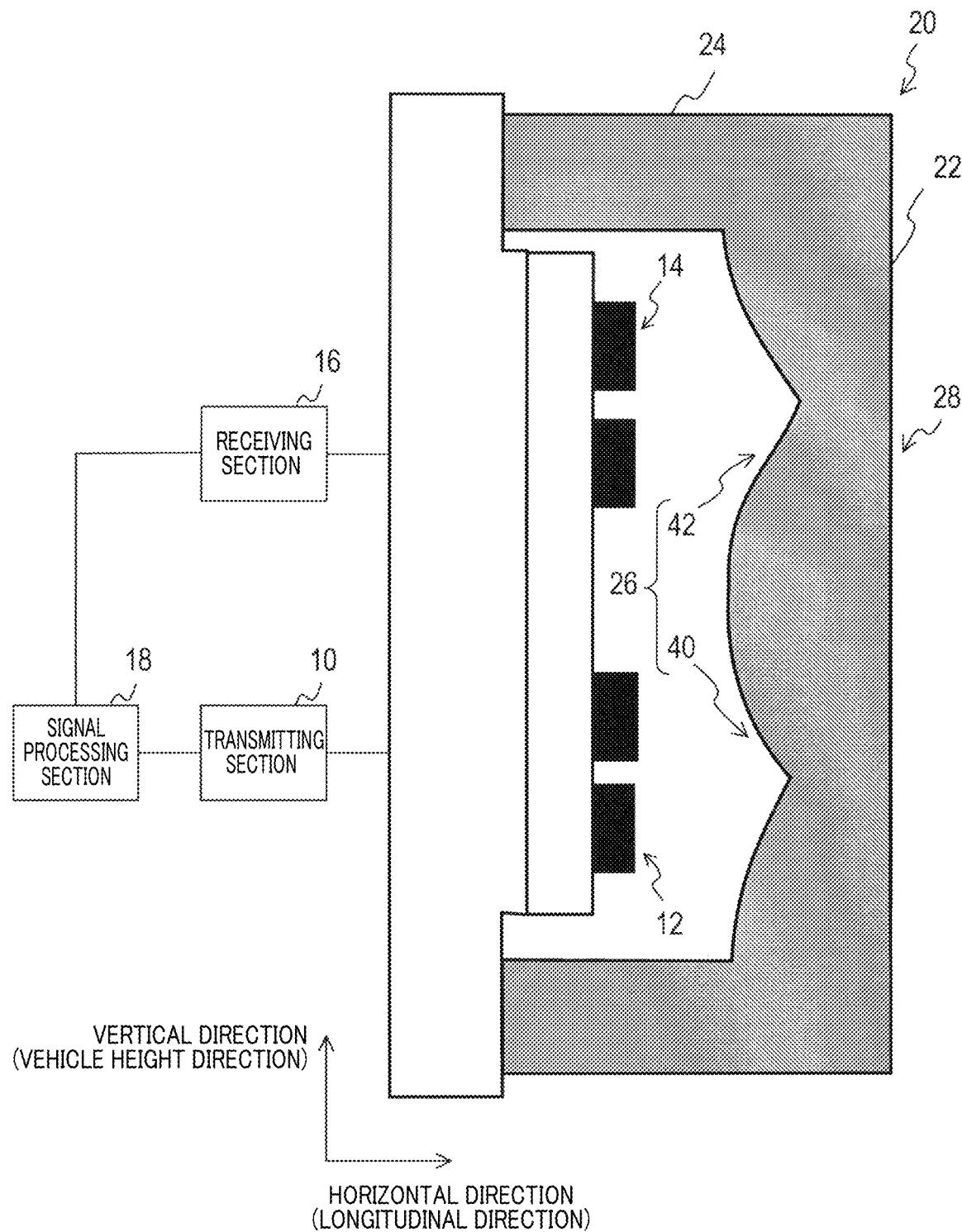
FIG. 5 is an explanatory diagram showing a modified example of the radar apparatus according to the first embodiment.

For example with the above embodiment, the cover member 20 is formed such that the cross-sections of the first face 26 along the vehicle height direction of the cover member 20 are uniform. However the cover member 20 of the present disclosure is not limited to this. That is, as shown in FIG. 5, a transmitting opposing face 40 and a receiving opposing face 42 may be formed in the first face 26 of the cover member 20, along the vehicle height direction.

Here, the transmission opposing face 40 is a surface which faces the transmitting antenna section 12. The receiving opposing face 42 is a surface which faces the receiving antenna section 14. That is, the receiving opposing face 42 is formed on the upper side, with respect to the vehicle height direction (i.e., with respect to the vertical direction) of the four-wheel vehicle 80, and the transmission opposing face 40 is formed on the lower side.

The transmission opposing face 40 is formed such that the thickness defined from transmission opposing face 40 to the second face 28 in the longitudinal direction of the vehicle 80 (i.e., the horizontal direction), decreases in accordance with increasing proximity to the center of the transmitting opposing face 40, with respect to the vertical direction, while the thickness increases in accordance with increasing proximity to the upper end and to the lower end of the transmitting opposing face 40, with respect to the vertical direction.

The upper part of the transmitting opposing face 40, which is above the center of the transmitting opposing face 40 with respect to the vertical direction, is formed with a specified radius of curvature as a curved surface that is convex towards the transmitting antenna section 12. The lower part of the transmitting opposing face 40, which is below the center of the transmitting opposing face 40 with respect to the vertical direction, is formed with a specified radius of curvature as a curved surface that is convex towards the transmitting antenna section 12.

In addition the receiving opposing face 42, which is continuous with the transmitting opposing face 40, is a surface that is not parallel to the transmission opposing face 40. The thickness at positions on the receiving opposing face 42, in a horizontal direction from the receiving opposing face 42 to the second face 28, decreases in accordance with increased proximity to the center of the receiving opposing face 42 with respect to the vertical direction, and increases in accordance with increased proximity to the upper end and to the lower end of the receiving opposing face 42, with respect to the vertical direction.

The upper part of the receiving opposing face 42, which is above the center of the receiving opposing face 42 with respect to the vertical direction, is formed with a specified radius of curvature as a curved surface that is convex towards the receiving antenna section 14. The lower part of the receiving opposing face 42, which is below the center of the receiving opposing face 42 with respect to the vertical direction, is formed with a specified radius of curvature as a curved surface that is convex towards the receiving antenna section 14.

With the cover member 20 configured as described above, the transmission opposing face 40 and the second face 28 are formed such as not to be parallel with one another. It thereby becomes possible to reduce the extent to which first reflected noise, which is reflected by the transmission opposing face 40, and second reflected noise, which is reflected by the second face 28, are in the same direction.

It thereby becomes possible to lessen a condition whereby the intensity of interference by the first noise and the second noise increases, and interferes with the probe waves transmitted from the radar apparatus 1 itself. That is, with the radar apparatus 1, the effects of interference due to reflected noise can be reduced.

Second Embodiment

The second embodiment of a radar apparatus differs from the first embodiment mainly with respect to the configuration of the cover member. Hence the configuration of the second embodiment will be described using the same reference signs as for the first embodiment, and the description will be centered on points of difference from the first embodiment.

Figure 6:
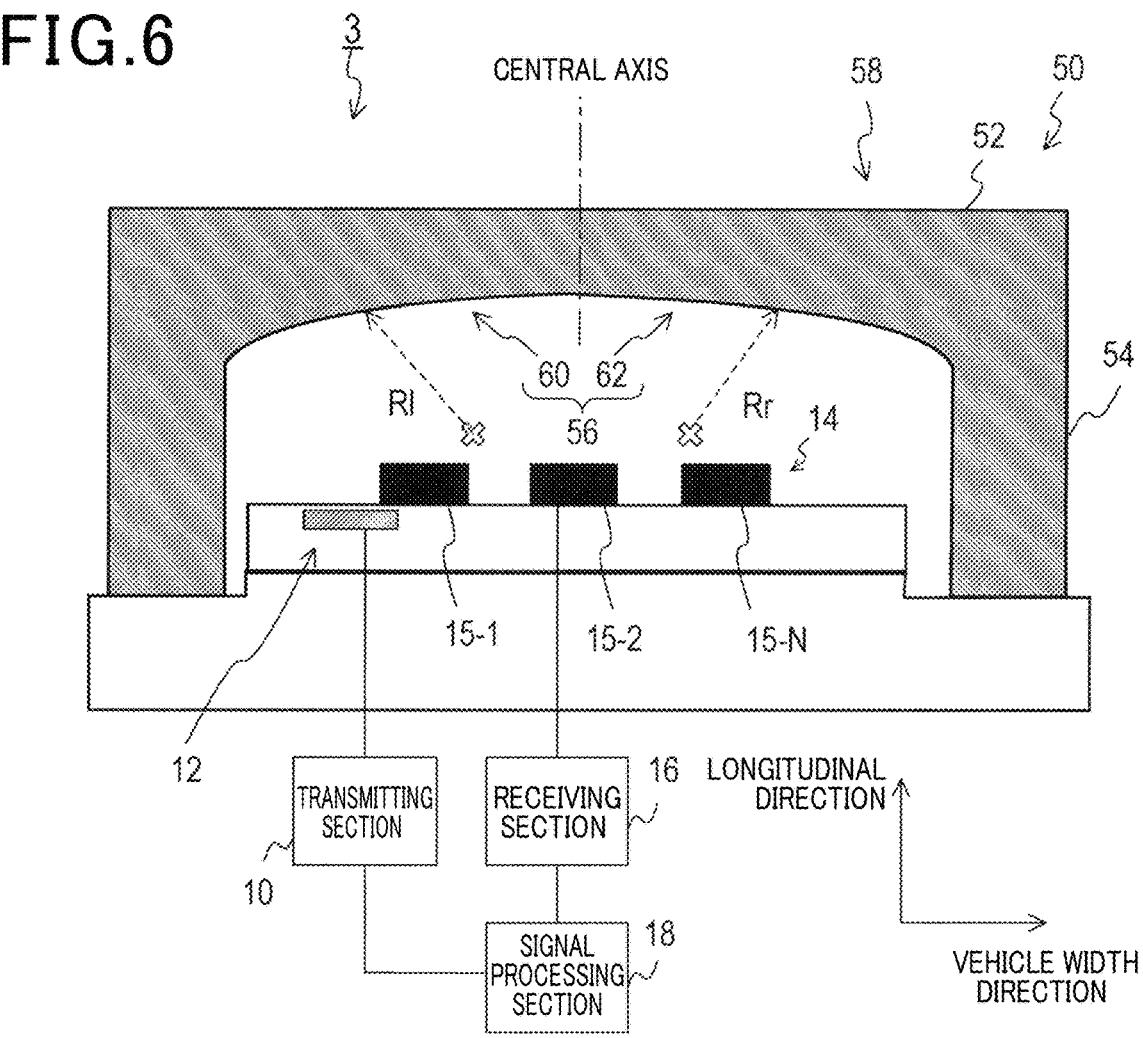
FIG. 6 is an explanatory diagram showing the general configuration of a second embodiment of a radar apparatus.

As shown in FIG. 6, the radar apparatus 3 of this embodiment includes a transmitting section 10, a transmitting antenna section 12, a receiving antenna section 14, a receiving section 16, a signal processing section 18, and a cover member 50.

<Cover Member>

The cover member 50 is what is called a radome, which covers the transmitting antenna section 12 and the receiving antenna section 14. The cover member 50 is formed of a material that is permeable to electromagnetic waves in the millimeter-wave band (that is, the probe waves) and is arranged to face the transmitting antenna section 12 and the receiving antenna section 14. The cover member 50 is shown in FIG. 6 in cross-sectional view, taken along the vehicle width direction and the longitudinal direction of the four-wheel vehicle 80.

The cover member 50 includes a cover center section 52 formed with a plate shape, and wall sections 54 extending upright in a common direction from the peripheral edge of the cover center section 52.

The cover center section 52 is formed with a first face 56 and a second face 58. The first face 56 is disposed opposite the receiving antenna section 14.

The second face 58 is formed on an opposite side from the first face 56 and is a face on which incoming waves are incident. The second face 58 of this embodiment is formed as a planar face, parallel to the horizontal and vertical directions.

The first face 56 is not parallel to the second face 58, and consists of a first opposing surface 60 and a second opposing surface 62. The first opposing surface 60 and the second opposing surface 6 constitute a continuous surface and are symmetrically formed with respect to the azimuth detection directions, having the center of the azimuth detection directions (i.e. the vehicle width direction) as a central axis.

The first face 56 is formed as a curved surface such that the thickness, as measured in the longitudinal direction from the second face 58, increases with distance from the central axis. Specifically, each of the first opposing surface 60 and the second opposing surface 62 is formed as a curved surface having a specified curvature radius R1, Rr. The circle centers corresponding to the radiuses of curvature are located on the side of the first face 56 at which the receiving antenna section 14 is positioned, with respect to the longitudinal direction. That is, each of the first opposing face 30 and the second opposing face 32 is formed with a curved surface that is concave toward the antenna elements 15.

Furthermore, the respective curvature radiuses R1, Rr of the first opposing surface 60 and the second opposing surface 62 are specified such that the phase difference between incoming waves received by the antenna elements 15 becomes large, for incoming waves at azimuth directions that are within a range of large angular values with respect to the frontal direction of the antenna elements 15.

Figure 7:
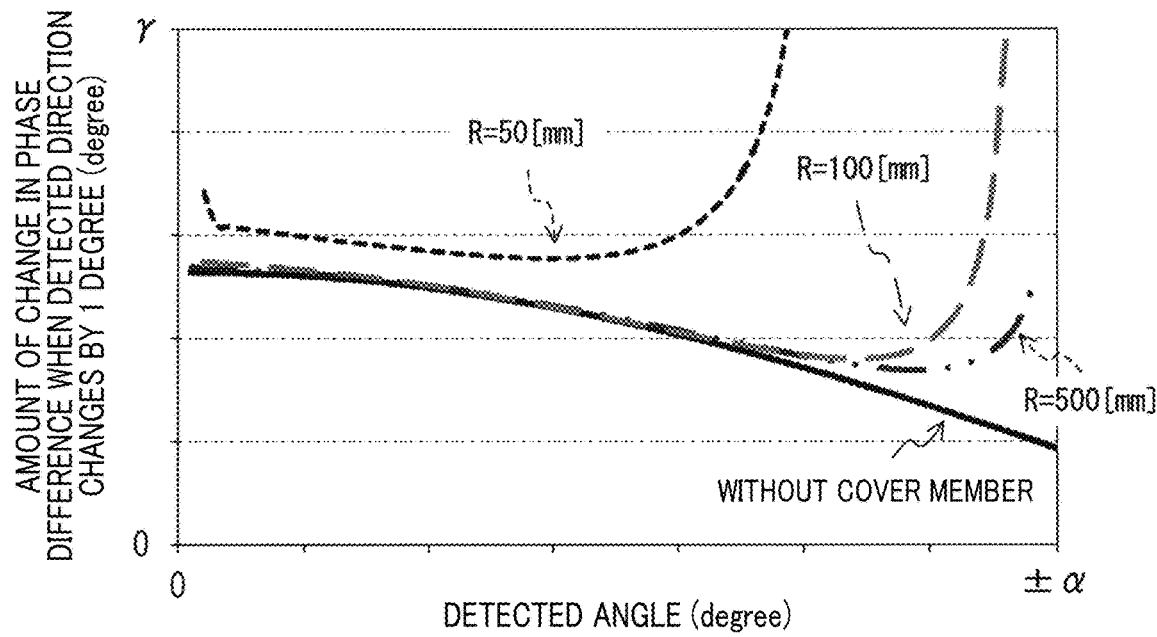
FIG. 7 is a diagram for describing the effects of a cover member in the second embodiment.

The radius of curvature R1, Rr of the first opposing surface 60 and the second opposing surface 62 may, for example, be in the range 100 [mm] to 500 [mm]. The reason for this is that, as a result of simulations executed by the assignees of the present disclosure, as shown in FIG. 7, it has been confirmed that if the curvature radiuses R1, Rr of the first opposing surface 60 and the second opposing surface 62 are 100 [mm] to 500 [mm], the phase difference at the antenna elements 15 between incoming waves at azimuth directions that are within a range of large angular values becomes large by comparison with the case of radar apparatus which is not provided with the cover member 50. FIG. 7 is a graph showing the results of simulation obtained with the cover member 50 described for the second embodiment, showing the amount of change in phase difference when the detection angle changes by 1 degree, for azimuth directions within the detection angle range.

With the present embodiment, the first face 56 and the second face 58 of the cover member 50 are formed such that the cross-sections are uniform along the vehicle height direction of the four-wheel vehicle 80.

Advantageous Effects of the Second Embodiment

With the cover member 50 of the present embodiment, of the incoming waves transmitted from the transmitting antenna section 12 that are reflected by a target, an increase can be achieved in the phase difference between those incoming waves which arrive at the antenna elements 15 along azimuth directions that are within a range of large angular values.

As a result, the radar apparatus 3 enables the accuracy of direction detection to be improved, for azimuth directions that are within a range of large angular values.

Other Embodiments

The present disclosure has been described in the above referring to embodiments, but is not limited to these embodiments and can be implemented in various modes without departing from the spirit of the invention.

With the first embodiment and the second embodiment described above, the installation location of the radar apparatus 1, 3 is in a forward part of the 4-wheel automobile 80, however the disclosure is not limited to this. That is to say, it would be equally possible for the radar apparatus to be installed in a side part of the 4-wheel automobile 80, or in a rear part of the 4-wheel automobile 80, or at some other location.

Furthermore with the first embodiment and the second embodiment described above, the radar apparatus 1, 3 is installed in a 4-wheel automobile 80. However the invention is not limited to installation in a 4-wheel automobile 80, and the radar apparatus 1, 3 could be installed in two-wheel motor vehicle, a bicycle, a ship, an aircraft, etc., i.e., in any type of mobile body.

Moreover with the first embodiment and the second embodiment described above, probe waves consisting of electromagnetic waves in the millimeter-wave band are used, however it would be equally possible for the probe waves to be light waves. That is to say, it would be equally possible for a radar apparatus according to the present disclosure to be a laser radar apparatus.

Furthermore it would be equally possible for the probe waves to be sound waves. That is to say, it would be equally possible for a radar apparatus according to the present disclosure to be what is called a sonar apparatus.

The cover members 20, 50 of the first embodiment and the second embodiment are disposed opposite both of the transmitting antenna section 12 and the receiving antenna section 14, such as to cover both the transmitting antenna section 12 and the receiving antenna section 14, however it would be equally possible for a cover member according to the present disclosure to be configured to cover only the receiving antenna section 14.

Furthermore in the first embodiment and the second embodiment, the first face 26, 56 is a curved surface which is formed such as to increase the phase difference, at the antenna elements 15, of incoming waves that are within a range of large angular values. However the present disclosure is not limited to the first face 26, 56 being the face that is curved in that way. That is to say, it would be equally possible for the second face 28, 58 to be a surface that is curved such as to increase the phase difference, at the antenna elements 15, of incoming waves that are within a range of large angular values.

Moreover with the first embodiment and the second embodiment described above, the cover member 20, 50 is configured as a radome. However a cover member according to the present disclosure is not limited to being a radome, and could for example be a bumper which covers the transmitting antenna section 12 and receiving antenna section 14, or some other member which covers the transmitting antenna section 12 and receiving antenna section 14.

Furthermore, configurations in which parts of the above embodiments are omitted may constitute embodiments of the present disclosure. Moreover, configurations which appropriately combine modified forms of the above embodiments also constitute embodiments of the present disclosure. Furthermore, all forms which do not depart from the spirit of the invention as set out in the wording of the claims also constitute embodiments of the present disclosure.

DESCRIPTION OF SIGNS

1, 3 . . . Radar apparatus 10 . . . Transmitting section 12 . . . Transmitting antenna section 14 . . . Receiving antenna section 15 . . . Antenna elements 16 . . . Receiving section 18 . . . Signal processing section 20, 50 . . . Cover member 22, 52 . . . Cover center section 24, 54 . . . Wall section 26, 56 . . . First face 28, 58 . . . Second face 30, 60 . . . First opposing face 32, 62 . . . Second opposing face 40 . . . Transmitting opposing face 42 . . . Receiving opposing face 80 . . . Four-wheel automobile

The invention claimed is:

1. A radar apparatus comprising:
 transmitting means for transmitting probe waves;
 receiving means having a plurality of antenna elements for receiving incoming waves by respective ones of the antenna elements;
 target detection means for detecting targets that are origins of the incoming waves, based on results of transmitting the probe waves and receiving the incoming waves;
 azimuth detection means for detecting azimuth directions in which the targets detected by the target detection means are present, based on phase differences between respective incoming waves received by the antenna elements, and
 a cover member that covers at least the receiving means, wherein the cover member includes:
  a first face disposed on a first side of a cover center section facing the receiving means and that passes the incoming waves,
  a second face disposed on a second side of the cover center section opposite the first side and that passes the incoming waves, and
  at least one wall section that extends away from the plurality of antenna elements and supports the cover center section relative to the plurality of antenna elements,
 wherein:
  the first face and the second face are not parallel to one another;
  at least one of the first face and the second face is formed with a curved surface along azimuth detection directions of the azimuth detection means, such that there is a phase difference between incoming waves that are received by the plurality of antenna elements and are within a range of angular values in the azimuth detection directions of the azimuth detection means; and
  the at least one wall section, is made of a same material as the cover center section in which the material is permeable to probe waves and incoming waves.

2. The radar apparatus according to claim 1, wherein the first face and the second face are formed symmetrically along the azimuth detection directions of the azimuth detection means, with the center of the azimuth detection directions as a central axis.

3. The radar apparatus according to claim 1, wherein a thickness, through which the incoming waves pass from the first face to the second face along azimuth detection directions, increases in accordance with increased displacement of the azimuth detection direction from a central axis.

4. The radar apparatus according to claim 2, wherein a thickness, through which the incoming waves pass from the first face to the second face along azimuth detection directions, decreases in accordance with increased proximity of the azimuth detection direction to the central axis.

5. The radar apparatus according to claim 1, wherein the first face is a curved surface having the circle center of the radius of curvature of the curved surface positioned on a direction of passage of the radar waves, on the side of the first face which is oriented towards the targets.

6. The radar apparatus according to claim 1, wherein the first face is a curved surface having the circle center of the radius of curvature of the curved surface positioned on a direction of passage of the radar waves, on the side of the first face which is oriented towards the plurality of antenna elements.

7. The radar apparatus according to claim 1, wherein:
 the radar apparatus is installed on a mobile body and the first face is a curved surface which has a radius of curvature along a longitudinal direction of the mobile body.

8. A cover member provided in a radar apparatus that includes transmitting means for transmitting probe waves, receiving means having a plurality of antenna elements for receiving incoming waves by respective ones of the antenna elements, target detection means for detecting targets that are origins of the incoming waves, based on results of transmitting the probe waves and receiving the incoming waves, and azimuth detection means for detecting azimuth directions in which the targets detected by the target detection means are present, based on phase differences between respective incoming waves received by the antenna elements, wherein the cover member covers at least the receiving means, the cover member comprising:

a first face disposed on a first side of a cover center section facing the receiving means and that passes the incoming waves, a second face disposed on a second side of the cover center section opposite the first side and that passes the incoming waves, and at least one wall section that extends away from the antenna elements and supports the cover center section relative to the antenna elements, wherein:

the first face and the second face are not parallel to one another;

at least one of the first face and the second face is formed with a curved surface along azimuth detection directions of the azimuth detection means, such that there is a phase difference between incoming waves that are received by the plurality of antenna elements and are within a range of angular values in the azimuth detection directions of the azimuth detection means; and the at least one wall section, is made of a same material as the cover center section in which the material is permeable to probe waves and incoming waves.

* * * * *